United States Patent [19]

Threlkeld

[11] 3,790,261
[45] Feb. 5, 1974

[54] LONG PLAY FILM CARTRIDGE AND PROJECTOR

[76] Inventor: Richard James Threlkeld, 6736 Tobias, Van Nuys, Calif. 91405

[22] Filed: May 17, 1973

[21] Appl. No.: 361,283

[52] U.S. Cl. .................. 352/72, 352/128, 352/176, 242/55.19 A
[51] Int. Cl. .......................................... G03b 23/02
[58] Field of Search .............. 352/72, 78, 128, 176; 242/55.19 A

[56] References Cited
UNITED STATES PATENTS
| | | | |
|---|---|---|---|
| 3,687,531 | 11/1970 | Bogdanowicz | 352/72 |
| 3,617,010 | 11/1971 | Coy | 242/55.19 A |
| 2,922,642 | 1/1960 | Cousino | 242/55.19 A |
| 3,311,315 | 3/1967 | Stark | 242/55.19 A |

Primary Examiner—Samuel S. Matthews
Assistant Examiner—Alan Mathews

[57] ABSTRACT

A long play film cartridge and projector wherein an endless loop of film may be nine hundred to 5,000 feet or more in length and which may be used to project a series of pictures continuously; the cartridge having a novel dish shaped film holding rotor of a material having a particular coeficient of surface friction with radiating film supporting ridges having upper surfaces declining downwardly from the outer periphery towards a central hub which is surrounded by a flat ring shaped surface portion with which the inner ends of said ridges are substantially flush, whereby a large spiral roll of film is carried on said film holding rotor and is fed therefrom near said hub where the relative center of said spiral roll is automatically maintained in loosely packed convolutions; said projector operated at a lower linear film rate than the linear film rate of said film holding rotor and the film holding rotor is actuated intermittently in response to tension on displacement of said film created by demand of said projector.

17 Claims, 13 Drawing Figures

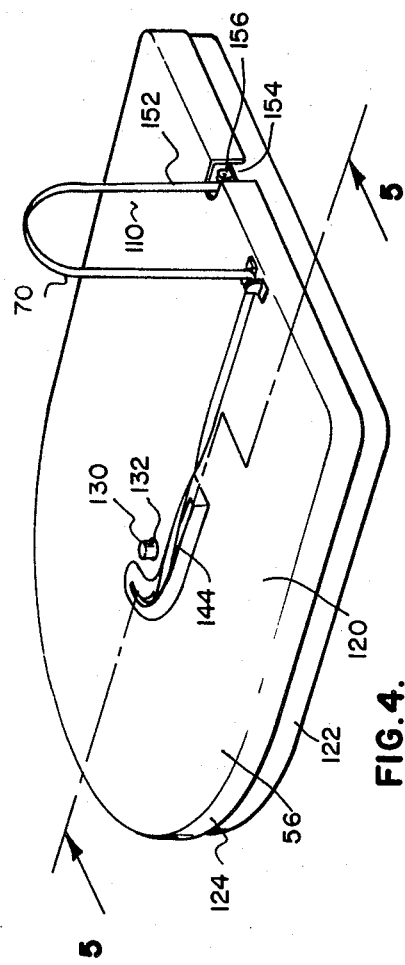
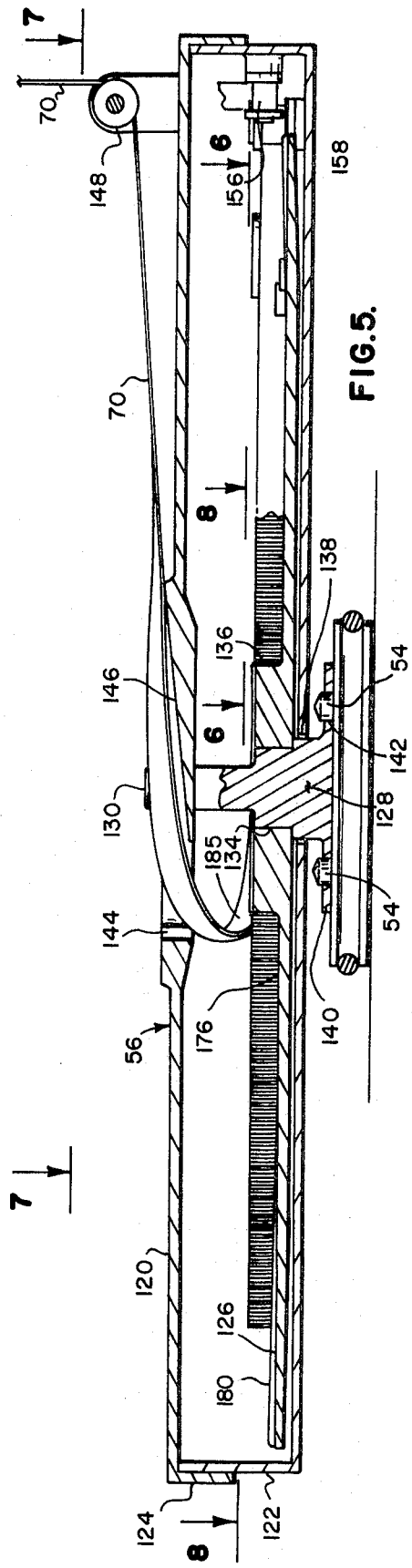

LONG PLAY FILM CARTRIDGE AND PROJECTOR

BACKGROUND OF THE INVENTION

Various cartridges have heretofore been utilized for holding endless loops of film in spiral convolutions wherein the convolutions are contiguous with each other such that the major portion of the endless loop of film is held in a tightly packed spiral roll and where the film has been fed on to the roll at the periphery and removed from the roll at the relative center of the roll. Such cartridges have been capable of functioning with small amounts of film however such conventional cartridges have been unable to hold large amounts of film without causing the film to pack and bind to the extent that the film may not be readily removed on a continuous basis from the relative center or the inward portion of the spiral roll of film. Long play continuous films have heretofore been limited due to the problem of accumulated packing density generally in proportion to the diameter of the spiral roll of film such that the spiral rolls heretofore have caused the film to be so tightly packed at the inner portion of the roll that removal of the film continuously becomes unreliable and accordingly the overall footage of film and the length of time of continuous operation which a continuous roll of film provides for projection of pictures has been substantially limited. It has been desirable in many uses to provide for continuous projection of a series of pictures from an endless loop of film for periods of up to three hours or more. However, prior art cartridges have posed many difficulties most of which result from tight packing of film at the inner portion of a spiral roll of film and consequently film cartridges have been limited to relatively short series pictures as well as to relatively short footage of film as compared to the desired amount of film which may range beyond 900 to 5,000 or more feet in a linear dimension. Many prior art projectors using spiral pack film cartridges operated in conjunction with a projector wherein it is necessary to project light through the film as well as prisms or mirrors for the purpose of directing the luminous image to a lens for a large projection on a screen or wall surface. In such instances the luminous efficiency of the projector and the cartridge combination has been somewhat compromised as compared to the use of many movie projectors where light is directly projected through the film and the lens on a common axis. Accordingly prior art use of spiral pack film cartridges has generally been in combination with prism orientated light from the film to the projector lens thereby limiting the luminousity of the resultant projections. The prior art combination has been quite common and has resulted from a lack of proper control between the spiral pack film cartridge and the projector as well as means for orientating the portion of the film relative to the projection of light so as to eliminate the necessity of utilizing prisms and on other means for changing the direction of the projection before it reaches the lens.

SUMMARY OF THE INVENTION

The invention comprises a novel long play cartridge having an endless loop of film wound on a generally dish shaped film holding rotor whereon an excess of 900 to 5,000 or more feet of film may be wound in a spiral roll so as to provide for projection of movies for a period of one hour or more before the endless loop repeats the series of pictures.

The aforementioned film holding rotor having a central upstanding hub surrounded by a substantially flat ring shaped film holding portion and provided with radially outwardly diverging ridges which are inclined upwardly from the ring shaped holding portion and which are flush with the periphery of the ring shaped holdng portion and wherein the coefficient of friction of the ring shaped holding portion is greater than that of the outwardly diverging ridges and whereby means winding the film on the periphery of a spiral roll on top of the ridges causes the roll to be dish shaped so that the lower edges of the convolutions of the spiral roll are gradually wedged inward on said ridges and make a transition from an inclination to a flat horizontal disposition at the bottom of the spiral roll of film when the spiral roll contracts from the ridges onto the flat ring shaped portion, all of which provides for relatively tightly packed convolutions of the roll of film near its periphery and relatively loose packed condition of the contiguous convolutions near the hub so that the film may be fed from the relative center of the spiral roll by rotation of the film holding rotor and outwardly through an inclined ramp in a generally s shaped curve configuration to a projector related loop of the film which passes through a constant drive projector and backwardly into the cartridge of the invention which directs the film again to the periphery of the spiral roll of film on the film holding rotor of the cartridge. The cartridge is provided with a spring loaded tensioning mechanism which is adapted to automatically compensate for slack in the film while the film holding rotor is operated intermittenly in response to demand of the projector which intermittenly causes tension in the film for operating an on-off switch which intermittenly energises the film holding rotor drive means. The film holding rotor drive means operates at a slightly greater linear film rate than the projector and both the film holding rotor and projector are operated by constant speed motors and the projector is operated by a positive drive mechanism so that the film demand action of the projector always precedes the action of the film holding rotor of the cartridge in relation to linear speed and so that the film tensioner mechanism of the cartridge may always take up slack between the film returning from the projector and the spiral roll of film on the film holding rotor during periods when the film holding rotor is operated intermittently and at a greater linear rate than the operation of the projector which intermittenly demands delivery of film from the film holding cartridge. The film holding rotor of the film holding cartridge is capable of holding an excess of 900 to 5,000 or more feet of film in a spiral roll wherein the convolutions of film are contiguous to each other and the cartridge film holding rotor is generally dish shaped at its upper surface due to outward inclination of radially disposed film supporting fingers so that the film frictionally is engaged convergingly between the fingers due to sag of the film as the spiral roll contracts and also lower edges of the film operating on the incline when moving from the periphery toward the hub of the film holding rotor cause the film to be held backward toward the periphery relative to the contraction of the roll of film toward the hub on the concentric ring shaped flat horizontal portion of the film holding rotor, thus a combination of several features of the generally dish shaped film holding rotor provide for tightly packed contiguous convolutions of the film on the relative periphery of the spiral roll and relatively loosely packed contiguous convolutions of film near the central hub of the film holding rotor, all of which contributes to the successful and reliable operation of a continuous play and continuous loop of film in excess of 900 to 5,000 or more feet adapted to provide for continuous and repeat movies lasting one hour or more. The film holding rotor is intermittenly motor driven and due to the loosely packed convolutions of the spiral roll of film near the hub of the rotor, positive rotation of the film holding rotor actually causes the film to be pushed out of the spiral roll near the relative center thereof and fed to an area wherein the projector related loop of film is directed toward the input of a positive drive projector.

The relative rate of operation of the projector and the film cartridge of the invention is such that the cartridge feeds film therefrom toward the projector at a greater rate than the linear film rate through the projector. As an example the cartridge feeds film toward the projector at a rate of 21.1 frames per second, while the projector is positively driven at a shutter speed of 20 frames per second, and thus the film holding rotor of the cartridge, as hereinbefore noted, operates intermittenly on demand of the projector, which operating at a slower rate, intermittently takes up slack and closes a normally open switch in circuit with the cartridge driven motor for intermittently operating the cartridge when lateral motion of a portion of the film is created by linear movement of another portion of the film through the projector.

The tension of the film, as for example, may equal substantially 2.5 inch ounces in order to operate a spring loaded switch to control intermittent rotation of the film holding rotor of the cartridge of the invention.

Synchronous motors are provided for individually operating the projector and the film holding rotor of the cartridge and these motors are constant speed motors. The drive in connection with the motor which operates the film holding rotor being such as to rotate the film holding rotor at a greater linear film rate than that of the projector. The cartridge assembly of the invention is adapted to deliver a projector related loop of film substantially perpendicular to the plain of rotation of the film holding rotor so as to provide orientation to the projector in such a manner as to permit the film to feed from the cartridge to the projector without the use of mirrors or primsm and so that projection of light passes directly through the film to provide optimum luminosity of the movie projections. The cartridge asembbly of the invention is such that rotation thereof by the respective drive motor actually forces film out of the cartridge from the loosely wound irrelative center of a spiral roll of film in the cartridge. The invention comprises a combination wherein an independantly driven film holding cartridge rotor and an independantly driven projector cooperate and wherein speed of the film through the projector is maintained at a constant rate and speed of the film from the cartridge is maintained at a constant rate but moved intermittently. The projector having a positive film drive means and specifically a sprocket and chain drive so that intermittent operation of the rotor of the film cartridge may be accomplished at a slightly greater film linear rate than that of the projector by a film tension operated switch which controls the motor driving the cartridge film holding rotor.

The invention also comprises novel frame mechanism supporting the projector and the cartridge of the invention so that the axis of the projector may be adjusted on three different axes namely around a horizontal axis, a vertical axis, and around the longitudinal axis of projection of the projector while the frame of the invention is fixed to a building room wall and while an endless loop or projector related portion of the film of the magazine is threaded through the projector film drive mechanism.

The invention also comprises a novel wall mounted projector and endless film cartridge, all controlled by an on-off switch which may be manually operated when the frame of the projector and cartridge is mounted on a building room wall. Additionally manual focus and framing adjustment means is also readily accessible to a person standing on the floor of a room while the projector and cartridge of the invention is mounted on a respective room wall.

The invention also comprises a cartridge having a rotatable film holding rotor made of plastic, which has positive polarity so as to neutralize any static charge which may tend to develop on the rotor thereby alleviating dust collection on the film and resultant film damage.

Accordingly, it is an object of the invention to provide a novel long play endless loop film cartridge and projector combination which is capable of projecting and repeating a series of movies for one hour or more and involving an endless loop of film which may exceed 900 to 5,000 feet in linear dimension.

Another object of the invention is to provide a continuous play projector cartridge, having a novel film holding rotor, provided with a central hub surrounded by a substantially horizontal ring shaped portion at the periphery of which radiating fingers are flush and which extend radially outward and upward on an incline such as to provide for winding of film in a contiguous spiral roll whereon film is wound at the periphery onto the roll and removed therefrom near the hub and whereby the foregoing features of the rotor provide for relatively loosely packed convolutions near said hub enabling film to be forced from said film holding rotor through a guide means simply by rotation of the film holding rotor of the cartridge of the invention.

Another object of the invention is to provide a novel means for controlling operation of an endless loop film holding cartridge and a projector wherein a projector related loop of film is driven by the projector and the film holding rotor of the invention delivers film to the projector and wherein individual motors drive the projector and the film holding rotor; the motor driving the film holding rotor being arranged to drive the film holding rotor at a slightly greater linear film rate than that of the projector and wherein a film sensing switch is operated by displacement of the film created by demand of the projector and said switch intermittently energizes the motor which drives the cartridge film holding rotor until displacement of the film is relieved whereupon the seitch is open and the operation of the film holding rotor is interrupted until the projector again creates displacement in the film and demands feed of film from the film holding rotor to the projector.

Another object of the invention is to provide positive drive means and synchronous motors for driving the projector and the film holding rotor of the invention in relation to the foregoing objects of the invention.

Another object of the invention is to provide a novel film holding cartridge adapted for long play operation involving and excess of 900 to 5,000 feet of film in a continuous loop and wherein means is provided to dispense the film from the cartridge into a projector related loop which passes directly through the projector without the need for reflectors or prisms so as to obtain optimum luminosity of the movies projected from the projector.

Another object of the invention is to provide a nobel long play film holding cartridge, having a continuous loop of film which may exceed 900 to 5,000 feet in linear deminsion and wherein novel means is provided for holding the film in a spiral roll of continuous convolutions such that the relative peripheral portion of the roll is tightly packed as compared to the relative center of the spiral roll which is maintained in a loose condition such that the adjacent convolutions of the spiral roll may readily be disposed to permit the feeding of film from the relative center of the spiral roll without undue friction or binding.

Further objects and advantages of the invention may be apparent from the following specification, appended claims, and accompanying drawings.

BRIEF DESCRIPTION OF THE DRAWINGS

FIG. 4 is a perspective view of the film holding cartridge of the invention showing a projector related loop of film extending therefrom;

FIG. 5 is an enlarged sectional view taken from the line 5—5 of FIG. 4;

DESCRIPTION OF THE PREFERRED EMBODIMENTS

Figure 1:
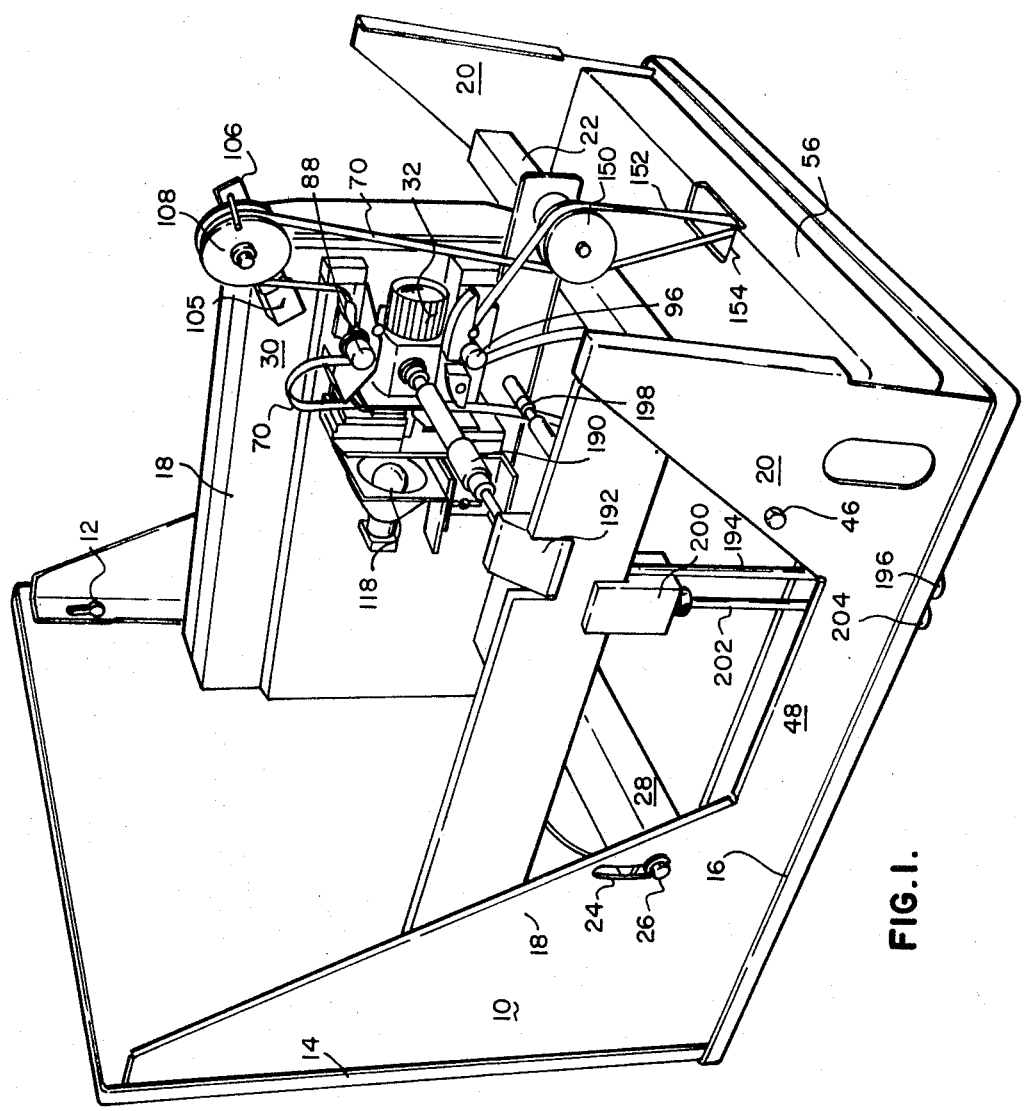
FIG. 1 is a perspective view of a film cartridge and projector of the invention carried by a wall mounted frame and showing the cover removed to expose the mechanical details of the projector and portions of the film holding cartridge.

The projector of the invention is provided with a frame 10 shown best in FIG. 1 of the drawings. This frame 10 is provided with fixture receiving openings 12, in its back plate 14 so that the plate 14 may be fixed to a vertical building room wall by headed fixtures such as screws or the like which extend through the slotted openings 12 and these slotted openings 12 are adapted to receive the full diameter of the head of such screws and then slide onto the shank of the screw at a narrower slot portion so that the frame 10 may readily be removed from the fixtures from time to time if desired.

The frame 10 is provided with an integral bottom plate portion 16 which is interconnected with the back plate 14 by structural gussets 18.

At a forward portion of the frame 10 are upstanding gussets 20 between which a cross bar 22 is mounted. The gussets 18, toward the plate portion 14, are provided with elongated slots 24 in which fixtures bolts 26 are adjustably mounted. These bolts 26 are secured to the cross bar 28, and as shown in FIG. 2, only one end of the cross bar 28 is shown and only one of the slots 24 is shown, however, both of the gussetts 18 are provided with a slot 24 and both ends of the cross bar are provided with a fixture bolt 26.

The projector 30 is substantially standard projector with a few modifications as will be hereinafter described in detail. This projector 30 as shown in FIG. 1 is mounted on the cross bars 22 and 28 and the various adjustments of the projector and the cross bars are shown diagrammatically in FIGS. 2 and 3 of the drawings.

The projector 30 is provided with a lens 32 which projects moving pictures and inasmuch as the frame 10 is mounted in fixed position on a wall it is necessary to adjust the projector 30 so as to align the axis of the lens 32 with a screen area and also to rotate projector about the projection axis of the lens so that the frame of the projected light will be parallel to the horizontal and vertical areas of the screen on which movies are projected. Additionally, it is necessary to tilt the axis of the lens relative to the horizontal and two directions in order to sight the axis of the lens accurately into the framing area of the projector screen.

Figure 2:
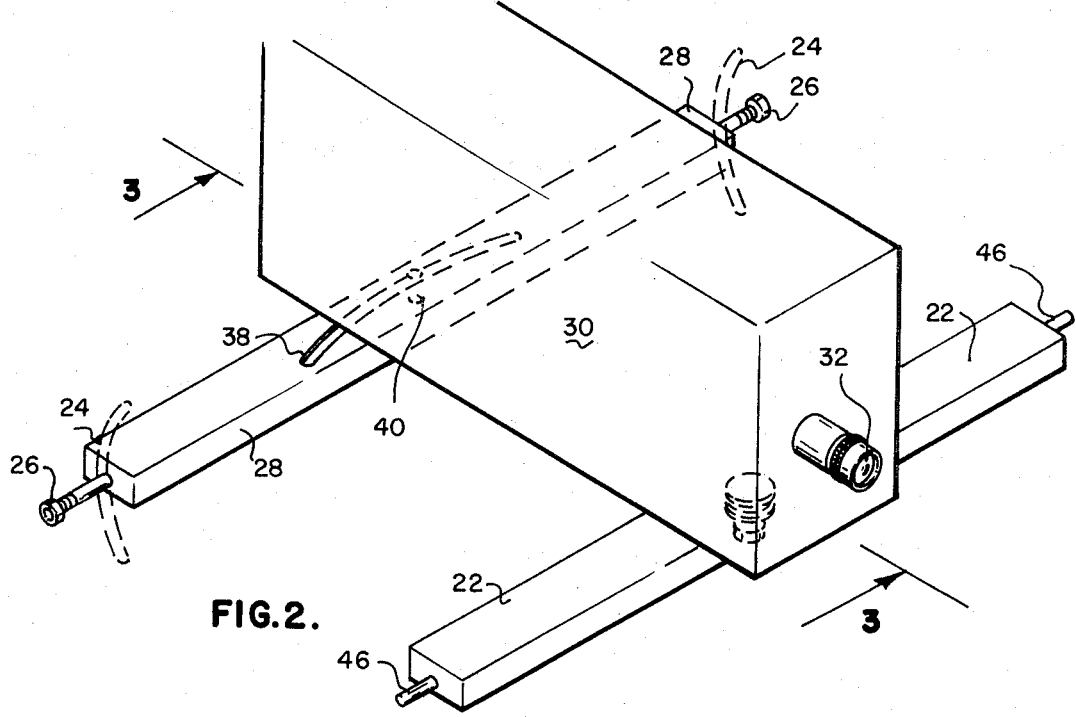
FIG. 2 is a diagrammatic view of the projector of the invention and related mechanical features for mounting the projector so that it may be adjusted about three axes in order to provide for adjustment alignment of the axis of projection when the frame of the invention is wall mounted.
Figure 3:
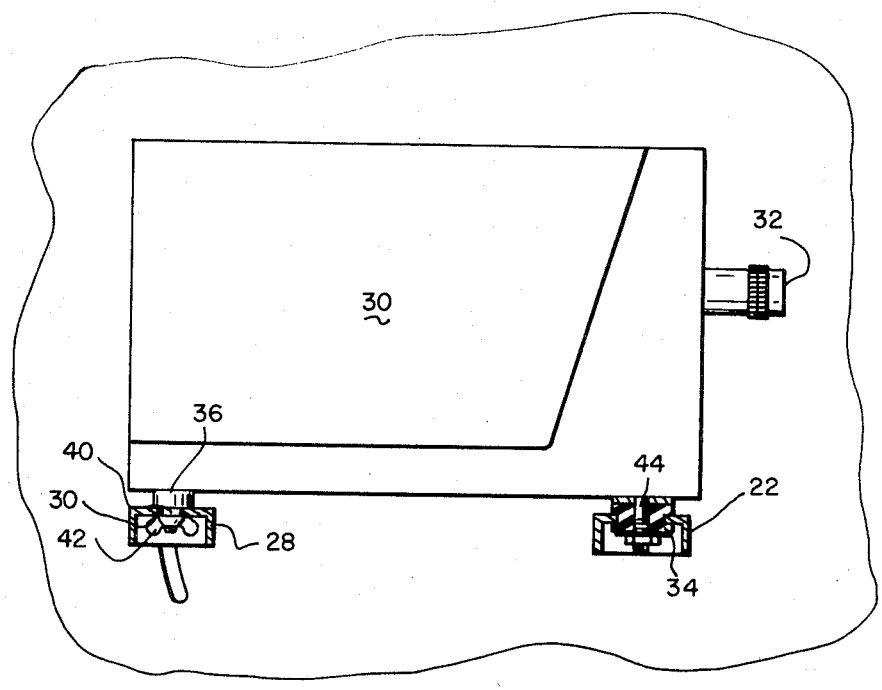
FIG. 3 is sectional view taken from the line 3—3 of FIG. 2.

With reference to FIGS. 2 and 3 of the drawings it will be seen that the projector 30 is provided with a flexible mount 34 carried by the cross member 22 so as to allow various tilting movements of the projector when a rearward portion 36 of the projector is adjusted on the bar 28 and also by means of the adjustment of the bar 28 itself relative to the gusset plates 18.

The bar 28 is provided with an arcuate slot 38 in which a bolt 40 is positioned. This bolt 40 is coupled to the projector 36 and a wing nut 42 is adapted to tighten the rear portion of the projector in fixed relation with the cross bar 28 when the bolt 40 is in a desired area of the arcuate slot 38. This slot 38 has a radius substantially concentric with mounting bolt 44 extending through the flexible mount 34 hereinbefore described.

The slot 38 and bolt 40 thus provide for horizontal pivotal movement of the projector 30 about the axis of the bolt 44 extending through the flexible mount 34 for horizontal adjustment of the axis of the lens 32. Opposite ends of the bar 28 by means of the bolts 26 are adjustably moveable in the slots 24 so as to either raise or lower the rear end of the projector or raise one side and lower the other side so as to tilt the projector around the horizontal axis of the lens 32. The bolts 26 are provided with nuts adapted to jam against the side of the gusset 18 on each end of the bar 28 in order to fix the bar 28 in its various adjustments as provided by the slots 24 and bolt 26. Opposite ends of the bar 22 are fixed to the gussets 20 by means of bolts 46.

The gussets 18 and 20 are interconnected by sideplate elements 48 which are integral with the gussets 18 and 20 and the bottom plate is provided with an upstanding shaft 50 on which is rotateably mounted a drive wheel 52 having upstanding projections 54 adapted to drive a film holding rotor of the film holding cartridge of the invention.

The film holding cartridge is shown in perspective in FIG. 4 and is designated 56. This cartridge 56 is shown in operative position in FIG. 1 of the drawings and is operated by a constant speed synchronous motor 58, shown best in FIG. 10 of the drawings and this motor 58 is provided with a drive pulley 60 driving a belt 62 which fits in a grooved perimeter 64 of the drive wheel 52, all as shown in FIG. 10 of the drawings.

Figure 10:
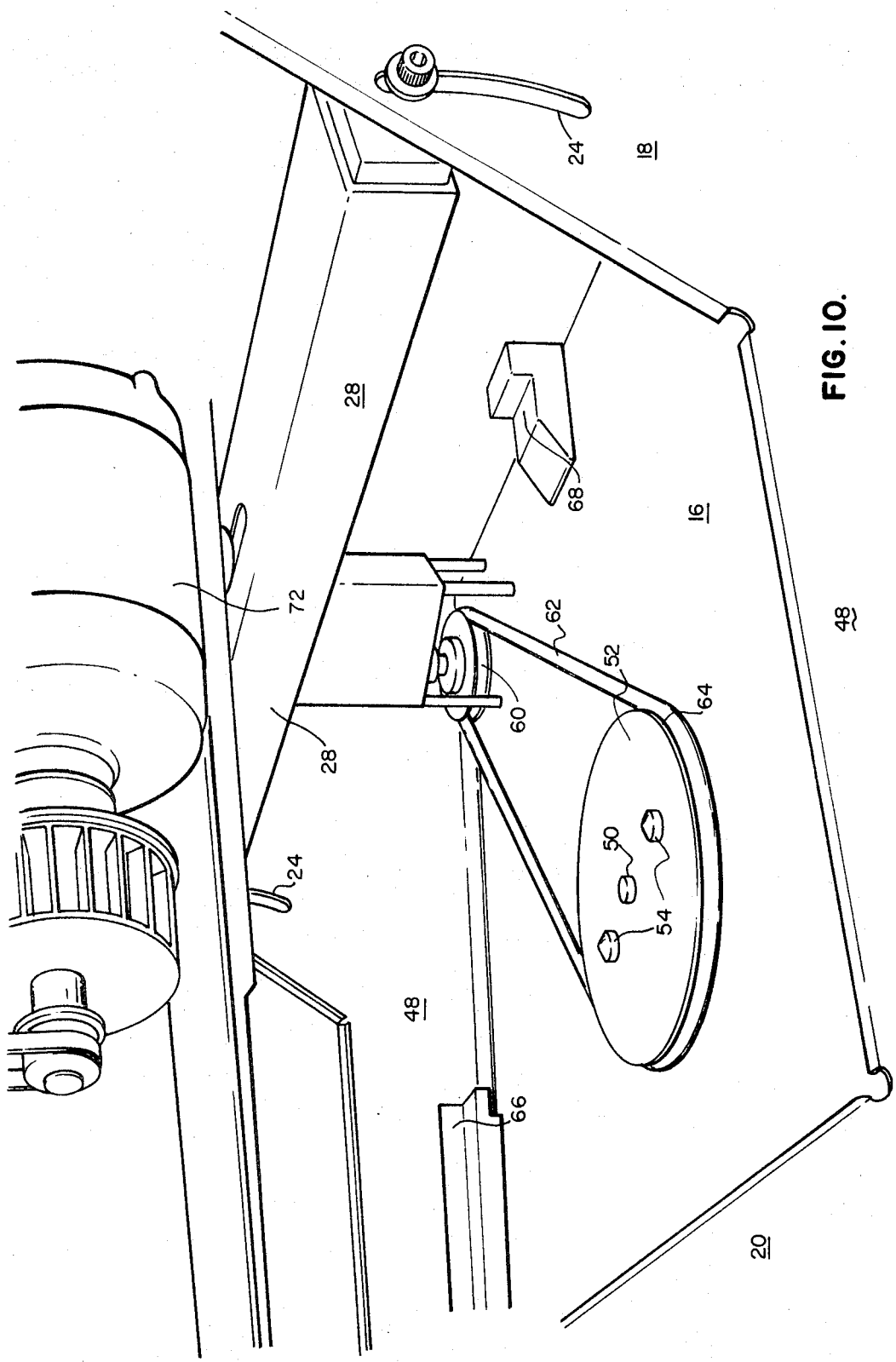
FIG. 10 is a perspective view of the film holding rotor drive means of the invention.

As shown in FIG. 10 of the drawings the frame 10, at its sides 48, is provided with supports 66 for opposite sides of the cartridge 56 and also provided with a support 68 for a rearward portion of the cartridge 56 when in operating position as shown in FIG. 1 of the drawings. It will be understood that the disclosure of FIG. 10 omits the cartridge 56 so as to show the details of its drive mechanism.

The cartridge 56 is a long play cartridge adapted to contain an excess of 900 to 5,000 feet of film and a projector related loop of film designated 70 in FIG. 4 extends upward from the cartridge 56 and is threaded through the substantially conventional drive mechanism of the projector 30 all as shown in FIG. 1 and as will be hereinafter described in detail.

Figure 9:
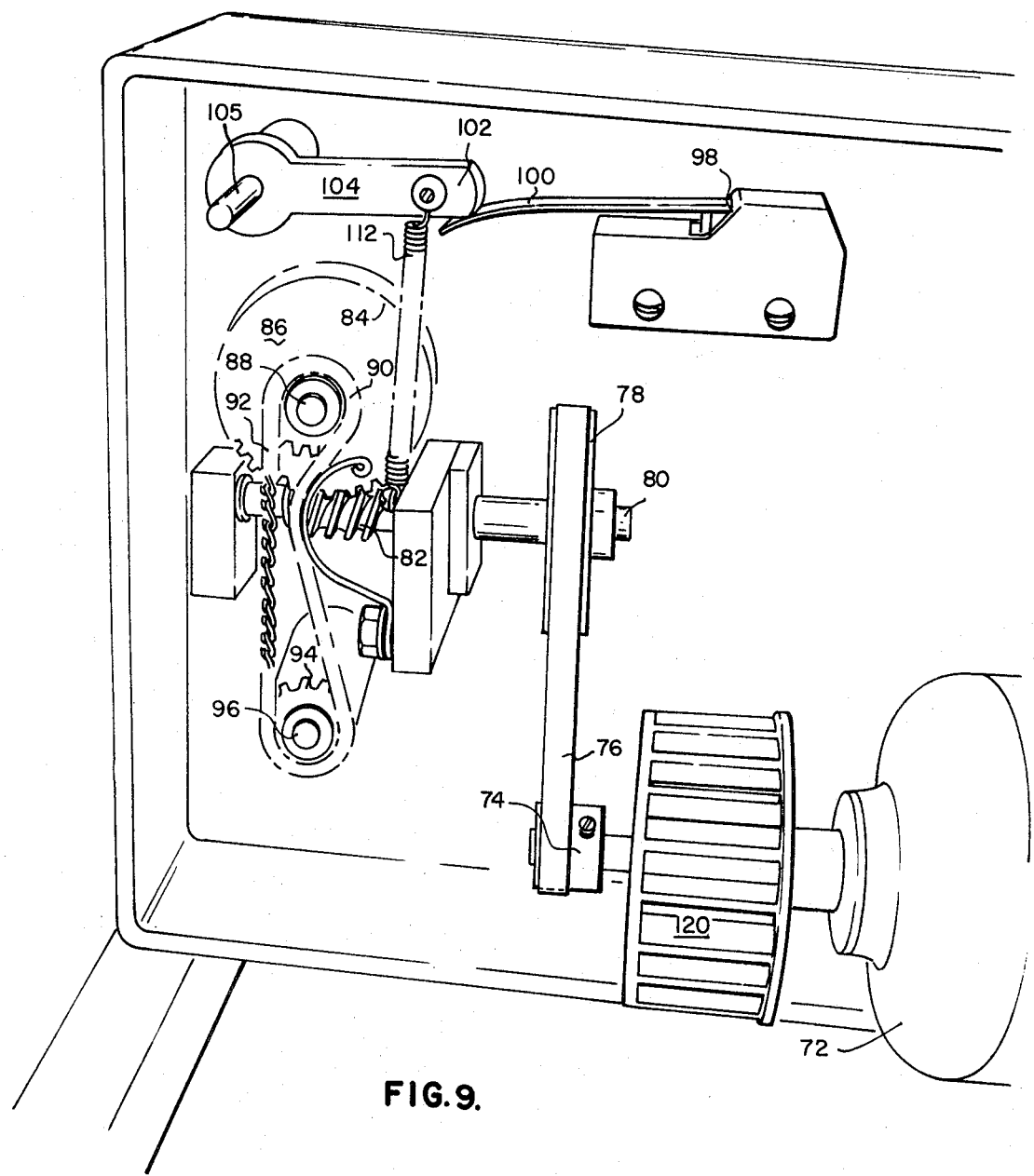
FIG. 9 is an enlarged sectional view of the mechanism of the projector of the invention taken from the opposite side from that as shown in FIG. 1.

The projector is provided with a constant speed synchronous drive motor 72 shown in FIG. 9 and 10 of the drawings. This motor is provided with a pulley 74 on its output shaft which drives a belt 76 engaged with another pulley 78 on a shaft 80 which drives a worm gear 82 meshing with the peripheral teeth 84 of a worm wheel 86. This worm wheel 86 is fixed to a shaft 88 which is also shown in FIG. 1 of the drawings and related to a positive drive rotor operating in a positive drive relationship with the projector related loop 70 of the film extending from the film cartridge 56. Refering again to FIG. 9 of the drawings it will be seen that a chain sprocket 90 is mounted on the shaft 88 and engages a positive drive chain 92 which extends over another positive drive sprocket 94 fixed to a shaft 96 which is also shown in FIG. 1 of the drawings. This shaft 96 also carries a conventional positive film drive rotor engaging the film of the projector related loop of film 70 shown in FIGS. 1 and 4 of the drawings. Accordingly it will be seen that the projector is constantly driven at constant speed by the synchronous motor 72 and that all of the drive mechanism is positive so as to correlate with the positive synchronous motor drive for driving the film holding rotor of the cartridge 56 as will be hereinafter described. Thus the synchronous motor 60 and the drive wheel 52 are positively driven, and as will be hereinafter described, it will be understood that the drive wheel 52 is driven at a speed such that film moves at a greater linear rate in the film cartridge 56 than it does through projector and that the motor 58 which drives the cartridge is controlled by a switch 98 having an actuating arm 100 engageable by an end 102 of a lever 104 fixed to a pivotal shaft 105 all of shown best in FIG. 9 of the drawings. This shaft 105 is also shown in FIG. 1 of the drawings and fixed to the shaft 105 at its opposite end from the lever 104 is another lever 106 which carries a rotor 108 over which a portion of the projector related loop of film 70 extends and this portion is at the input side of the projector so that when the projector passes sufficient film through to create displacement of the film over the roller 108 it causes pivotal movement of the lever 106 and pivots the shaft 105, as shown if FIG. 1 of the drawings, to also cause movement of the lever 104 as shown in FIG. 9 of the drawings against arm 100 for closing the switch 98 which is in circuit with the motor 58; thus to energize the motor 58 and to start operation of the drive wheel 52 for driving the film holding rotor of the cartridge 56 to force film in the direction of an arrow 110 in FIG. 4 of the drawings toward the roller 108 so that displacement of the film will be relieved and allow the lever 106 to pivot upwardly, as shown in FIG. 1 of the drawings, under tension of a spring 112 connected to the lever 104 as shown in FIG. 9 of the drawings, this actuating the lever 100 to operate the switch 98 and de-energize the motor 58. Thus the cartridge film drive is momentarily intermittently operated in response to the operation of the projector 30 so that the cartridge feeds the projector on demand which projector operates at a lower linear film rate than the cartridge, allowing it to operate intermittently on demand of the projector.

Figure 13:
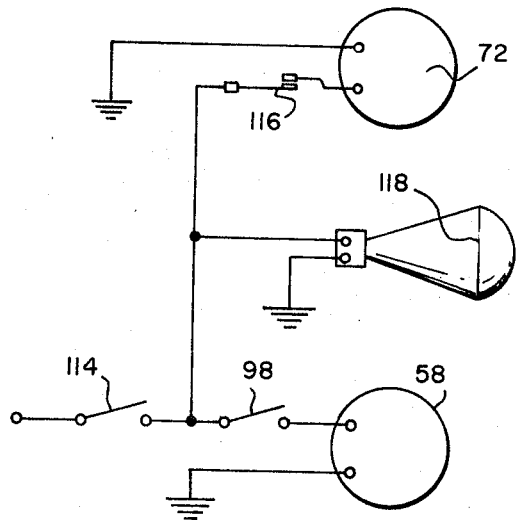
FIG. 13 is a diagrammatic view of the electrical wiring related to the projector and cartridge drive motors of the invention.

With reference to the diagrammatic illustration of FIG. 13 it will be seen that the switch 98 is energized through a projector on-off switch 114 and that the projector drive motor 72 is energized through a similarly controlled switch 116 responsive to heat from the projector light source lamp 118. The switch 116 may be a bi-metal or similar on-off switch and operates such that it remains closed for some time after the lamp 118 is shut off thereby maintaining operation of the motor 72 for a period of time after the lamp is shut off by the on-off switch 114 so as to insure film movement and cooling for periods of time after the lamp is shut off and this is accomplished by means of a fan 120 on the shaft of the motor 72 as shown in FIG. 9 of the drawings.

The film cartridge 56, as shown in FIGS. 4 and 5 of the drawings, is provided with a cover 120 and a box like base 122. The cover is provided with a flange 124 overlying the outer sides of the box like base 122 and rotatably mounted in the base 122 is a film holding rotor 126. Fixed to the film holding rotor at the center thereof is a shaft 128 having an upstanding stub 130 which extends through an opening 132 in the cover 120. This shaft 128 is provided with an enlarged portion 134 which carries a hub portion 136 of the film holding rotor 126 and the shaft extends downwardly through a central opening 138 in the base 122 and is provided with a flange 140 having openings 142 extending there through. These openings are adapted to receive the projections 54 connected to the drive wheel 52 hereinbefore described with relation to FIG. 10 of the drawings. It will be understood that the entire projector cartridge 56 may be inserted into the frame of the invention on the supports 66 and 68, shown in FIG. 10, and engaged with the pins 54 by slight downward vertical movement so as to place the openings 142 over the projections 54 as shown best in FIG. 5 of the drawings. This operation may necessitate rotation of the film holding rotor 126 so as to index the openings 142 with the projections 54.

When the film holding cartridge 56 is located in the frame 10 as shown in FIG. 1 and engaged with its respective drive mechanism as shown in FIGS. 5 and 10, the projector related loop of film 70 is threaded through the projector as shown in FIG. 1 so as to operate as will hereinafter be described. The projector related loop of film 70 emerges from the film holding cartridge 56 through a substantially arcurate slot 144 in the cover 120 and this slot 144 is provided with an arcuate inclined ramp 146 which directs the film upwardly through the upper side of the cover 120 whereon it passes over a roller 148 carried by the cover 120 and from the roller 148 it passes over another roller 150 mounted on the bar 22 and upwardly to the switch operating roller 108 hereinbefore described.

Figure 6:
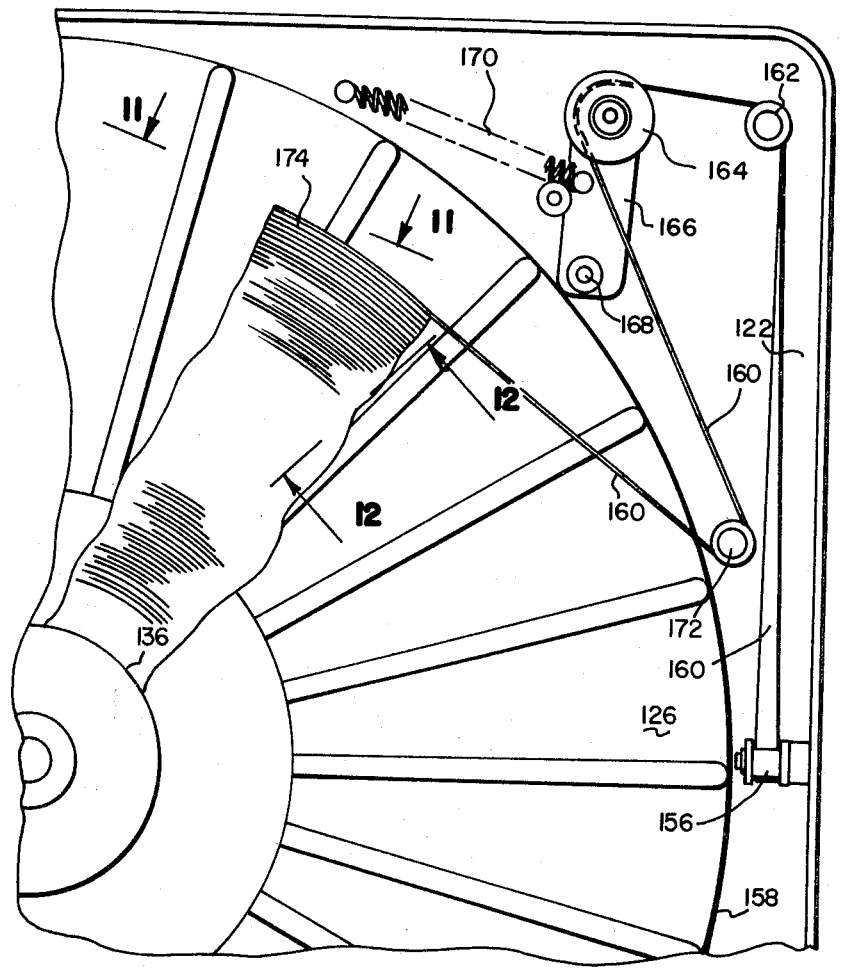
FIG. 6 is a fragmentary plan sectional view taken from the line 6—6 of FIG. 5.

The portion of the projector related loop of film 70 wich re-enters the cartridge 56 is shown at 152 in FIG. 1 of the drawings and this portion 152 of the projector related loop 70 re-enters the cartridge through an opening 154 in the cover 120. The film portion 152 re-entering the cartridge through the opening 154, passes over a roller 156 shown best in FIGS. 5 and 6 of the drawings. This roller 156 is mounted in the base of structure 122 beyond the periphery 158 of the film holding rotor 126 as shown best in FIGS. 5 and 6 of the drawings.

The film inside the cartridge continuing from the entering portion 152 of the projector related loop 70 is designated 160. Thus the film inside the cartridge is designated 160 and passes from the roller 156 in a right angle twist over another roller 162 carried in the base and then over a spring loaded slack take-up roller 164 mounted on a lever 166 which is pivoted on a pin 168 carried by the base portion 122. A spring 170 tends to pivot the lever 166 and roller 164 so as to maintain a condition of tension on the film portion 160 inside the cartridge. The film portion 160 passes from the roller 164 over a stationary roller 172 carried by the base 122 and then the film 160, inside the cartridge, passes into a spiral roll designated 174. This spiral roll, receives film, at its periphery, from the roller 172 and the spiral roll consisting of contiguous convolutions wherein opposite sides of the film are engaged in contiguous relation in the spiral roll. The spiral roll has a relative center disposed adjacent to the hub 136 of the film holding rotor 126 and the film passes out of the cartridge from a position adjacent to the hub 136 through the slot 144 and over the roller 148 to the projector via the roller 150 shown in FIG. 1 of the drawings.

Figure 8:
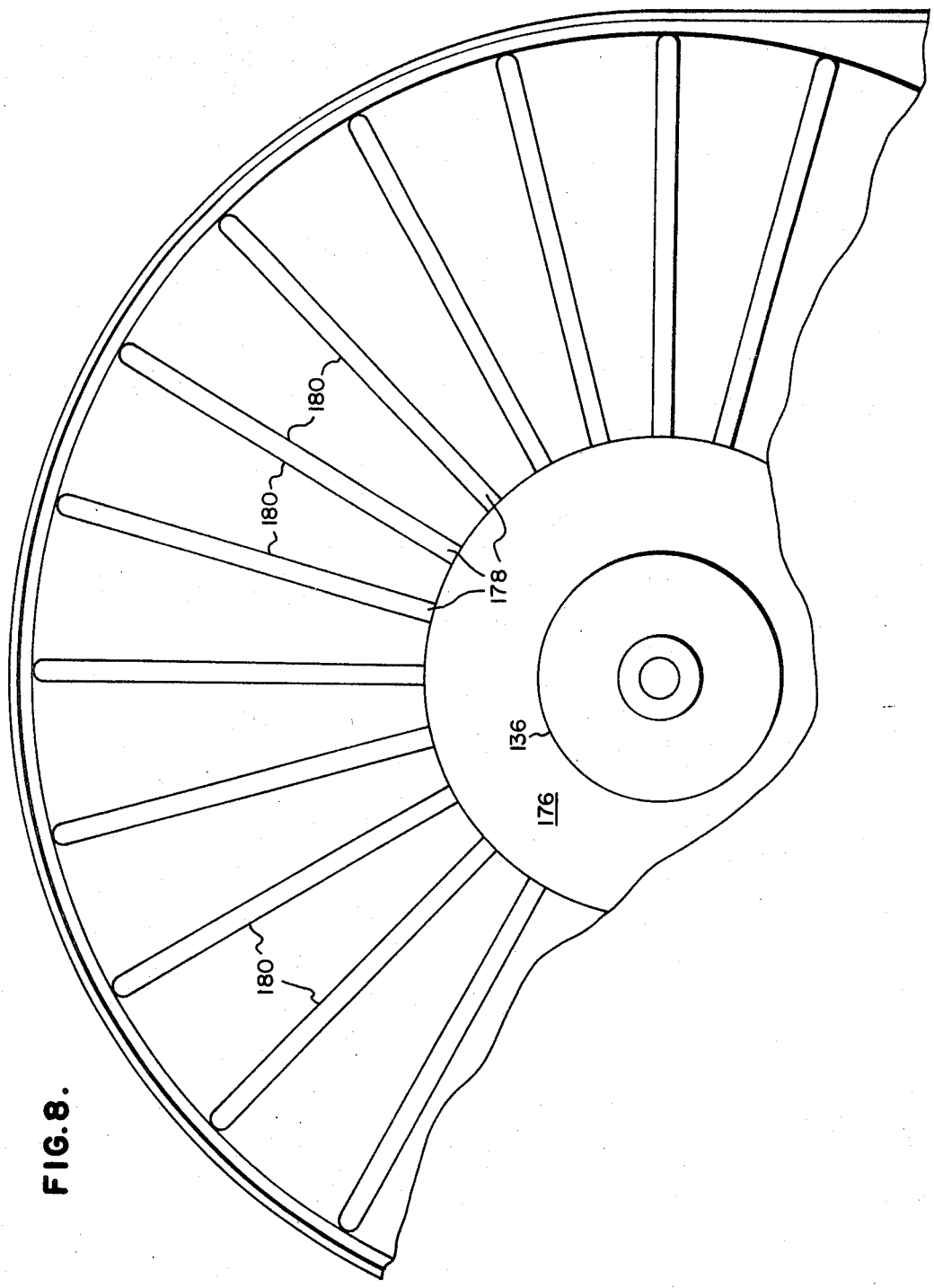
FIG. 8 is a fragmentary plan sectional view taken from the line 8—8 of FIG. 5, showing the film holding rotor of the film cartridge of the invention.
Figure 11:
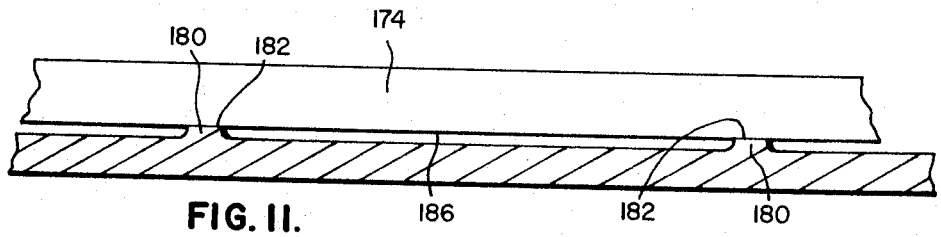
FIG. 11 is an enlarged fragmentary sectional view taken from the line 11—11 of FIG. 6.
Figure 12:
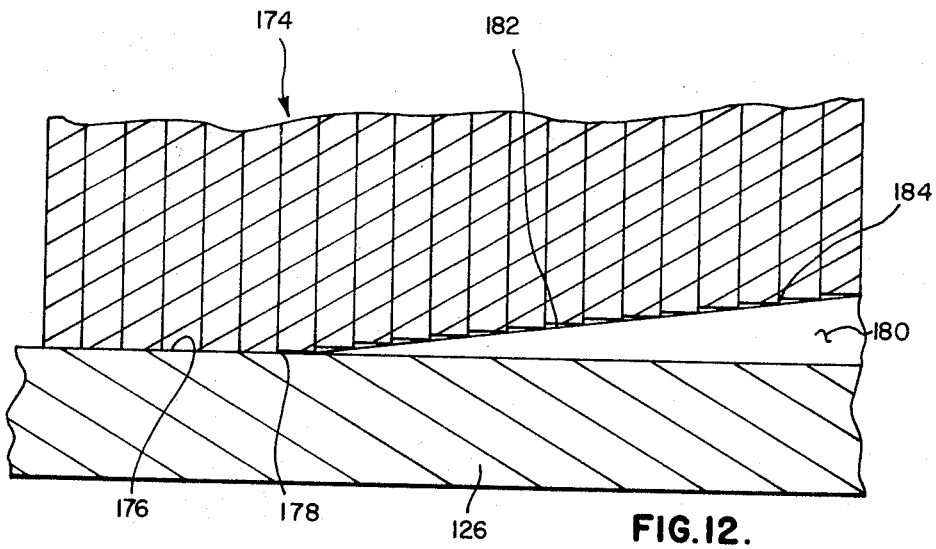
FIG. 12 is an enlarged fragmentary sectional view taken from the line 12—12 of FIG. 6.

The film holding rotor is provided with upper surface configuration shown best in FIGS. 5, 8, and 12 wherein the hub 136 is an upstanding generally circular structure extending above a generally ring shaped and horizontal film holding portion 176 which holds contiguous spiral convolutions of film on a substantially horizontal plane wherein the sides of the film are substantially contiguous to each other and the edges of the film rest on the ring shaped surface 176. The ring shaped surface 176 is substantially flat and horizontal and flush with the upper surface of the ring shaped surface 176 are inner ends 178 of outwardly radiating fingers 180 as shown best in FIGS. 8, 11, and 12 of the drawings. These fingers diverge radially from the ring shaped surface 176 and also extend upwardly from a horizontal plane on the inclined position from the inner end 178 as shown in FIGS. 8 and 12 of the drawings. The inner ends of the radiating fingers 180 provide a flush transition from the inclined surfaces 182 of the fingers and the ring shaped horizontal surface 176 hereinbefore described.

It will be seen that the convolutions of the film in the film pack on spiral roll 174, on the film holding rotor 126, have their lower edges progressively moving inwardly on the inclined surfaces 182 of the fingers 180 toward the horizontal ring shaped surface 176 surrounding the hub 36. As shown in FIG. 12 of the drawings each individual convolution of the film is provided with one lower edge portion 184 engaging the respective incline surfaces of the radiating fingers 180 and thus the spiral pack of film designated 174 is maintained in a generally dish shaped configuration shown in FIG. 11 of the drawings, the film pack on spiral roll 174, at its outermost portion, sags slightly between the upper surfaces 182 of the radiating fingers 180. It being noted that the film at 186 in FIG. 11 sags slightly below the upper surfaces 182 and thereby provides for slight inward wedging of the film path between the radiating and inwardly converging fingers 180 as the film is fed out of the relative center and contracts toward the hub 136.

The transition of the spiral convolutions from a dish shaped configuration on the fingers 180 to a flat configuration on the ring shaped surface 176 tends to cause a generally tightly wound condition of the spiral roll of film 174, near the periphery, and to permit the film near the hub 136 to be relatively loosely packed so that freedom of the film is provided for passage freely from its position around the hub 136 and upwardly at 188, are shown in FIG. 5 of the drawings, through the slot 144 and up the ramp 146 in an arcuate path around the shaft 130, so as to provide a generally S shaped feed of the film in loose condition from its position around the hub 136 to the output roller 148.

The continuing resistance of the film in a stationary state, to the accelerative force of the film holding rotor creates a resultant force affecting the film to move outwardly toward the periphery in each convolution of film; whereby the innermost convolution of film at the relative center is inhibited from said outward movement by successive convolutions of itself therearound; said inhibiting force resulting in a linear force in a linear direction of the film; thus forcing the film to depart the innermost convolution of the plane of rotation at the line of least resistance.

Figure 7:
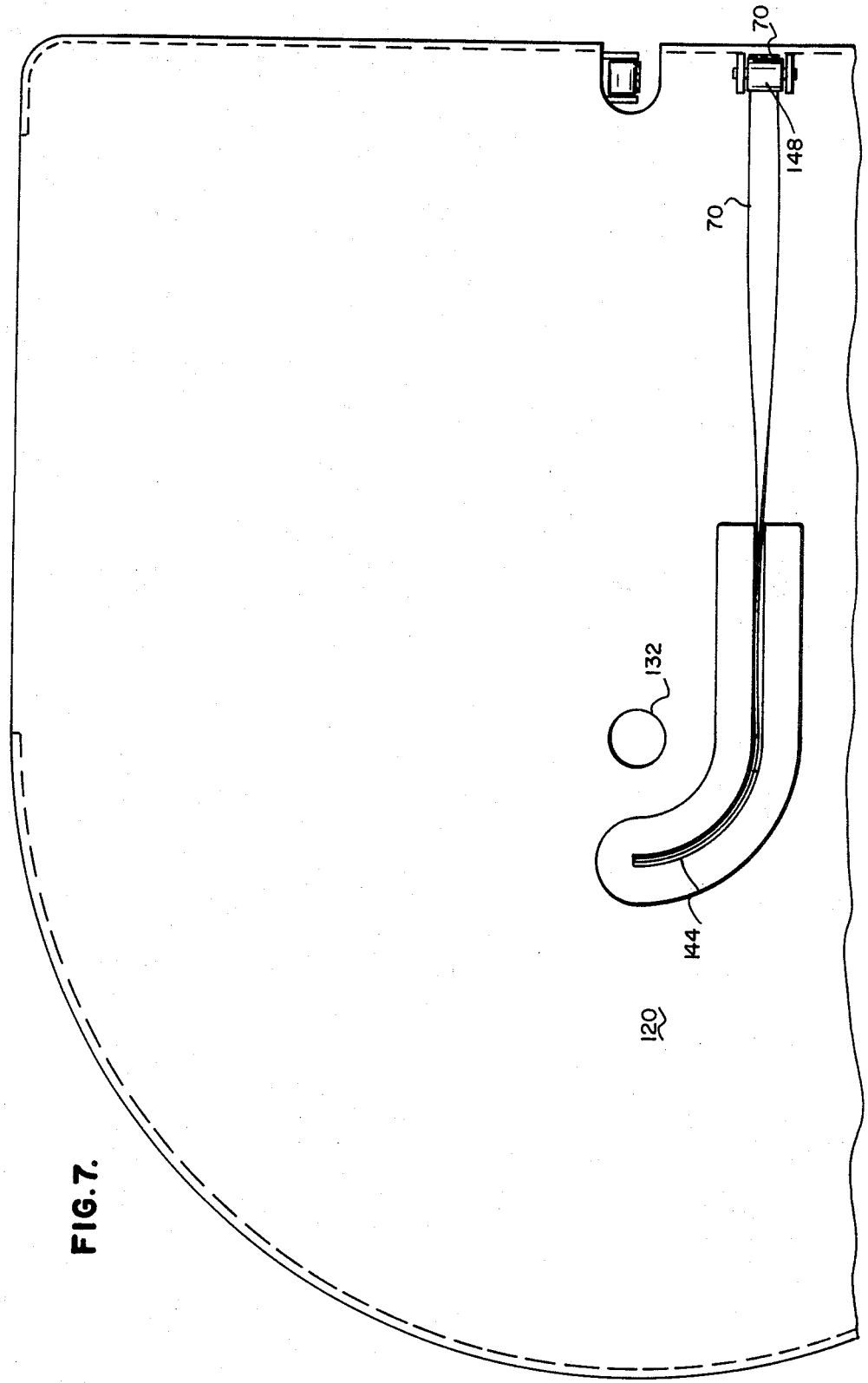
FIG. 7 is a fragmentary plan view of the cartridge of the invention taken from the line 7—7 of FIG. 5.

Referring in detail to FIG. 7 it will be seen that the slot 144 in the cover 120 is arcuate and disposed generally in alignment with the periphery with the hub 136 and outwardly therefrom and substantially concentric about the opening 132 in the cover 122 which the upper end of the shaft 130 projects.

The film holding rotor 126 is made of material having a positive polarity so as to avoid a collection of dust and to avoid the common problems of static charges in relation to the spiral roll pack of film on the film holding rotor 126.

Due to the loosely wound condition of the film adjacent to the hub 136 of the film holding rotor, operation of the motor 158 causes rotation of the film holding rotor in such a way that it actually forces the film at 185 outwardly through the slot 144 and thus allows the film to readily permit pivotal movement of the rotor 108 by pivoting its spring loaded supporting lever 106 and shaft 105 as to de-energize the motor 58 when a portion of film has been fed intermittently toward the projector to satisfy the demands thereof which is intermittently created by displacement of the film operating the switch 98 through pivotal action of the arm 102 on the shaft 105 which is fixed to the lever 106 carrying the rotor 108.

It will be appreciated by those skilled in the art that the combination of the inclined radial fingers have innermost portions 178, flush with horizontal ring shaped configuration of the rotor, all provides for a combined spiral contraction of the spiral roll of film 174 in such a manner as to hold the pack tightly wound near the periphery of the spiral pack and to cause loosely packed condition of the relative center of the spiral film pack 174 around the rotor 136 so as to allow freedom of the film to being removed from and pushed through the slot 144 toward the projector hereinbefore described.

As shown in FIG. 1 of the drawings a focusing adjustment shaft mechanism is provided for focusing the lens 32 and this shaft mechanism is designated 190 and is provided with a removeable coupling so as to permit the projector related loop of film 70 to be threaded through the projector in the conventional manner. This shaft 190 is coupled with a right angle gear box 192 which is driven by a manually operable shaft 194 coupled to manually operable knob 196 on the bottom of the frame plate 16. This knob is readily accessable to the operator standing on the floor above which the projector is mounted. Likewise a shaft 198 is coupled to the projector for adjusting the frame disposition of the projector and this shaft mechanism 198 is provided with a removeable portion, similar to that of the shaft 190, and is coupled to a right angle gear box 200 having a manually operable shaft 202 coupled to a manually operable know 204 on the bottom of the frame 16 adjacent to knob 196 so that both focusing and frame adjustment of the projector may be accomplished readily by an operator standing on the floor above which the projector is mounted. Furthermore, switch 114 as shown in FIG. 13 is located similarly to the manually adjustable knobs 196 and 204 so that all the controls of the projector may be operated by a person standing on the floor below the projector.

The adjustments hereinbefore described in relation to FIGS. 2 and 3 of the drawings permit initial set-up of the projector so that it aligns perfectly with the screen both horizontally and vertically and in a plumb relationship regarding the framing of the picture on the screen. It will be appreciated by those skilled in the art that the details of the film holding rotor 126 provides for a holding of a continuous loop of movie film in a spiral pack wherein an excess of 900 to 5,000 feet or more of film may be packed in such a manner that the relative center of the spiral pack is loose enough to permit the film readily to be removed from the relative center while the endless loop of film is rewound on the periphery of the spiral pack. Thus as shown in FIG. 4, the cartridge of the invention containing the projector related loop of film 70 is part of the entire endless loop of film in the spiral pack 174 supported on the film holding rotor 146 in a dish shaped configuration, all of which promotes the use of a projector demand system for operating the film holding rotor at a greater linear film rate than that of the projector and intermittently so that there may be complete coordination between the projector and the spiral film pack in such manner that the film may be directed directly from the cartridge to the projector oviating use of prisms or the like for changing the direction of light projection and thereby providing for more efficient projection of light relative to film of a continuous loop spiral pack configuration.

It will be obvious to those skilled in the art that various modifications may be resorted to without departing from the spirit of the invention.

I claim:

1. In a continuous play projector cartridge, the combination of; a base cartridge housing structure; a cover for said base housing structure; a film holding rotor rotabaly mounted in close proximity to said base housing and disposed beneath said cover; said film holding rotor being generally circular and rotatable about a substantially vertical axis of rotation; drive means on said rotor adapted for rotatably driving said film holding rotor relative to said base housing structure and said cover; said film holding rotor having an upper side adapted to hold a spiral roll of film thereon; said upper side having a generally flat and generally horizontal ring shaped film supporting surface portion which is substantially concentric with said axis of rotation; a generally circular film engaging hub disposed generally concentric within said ring shaped surface protions; said upper side of said film holding rotor having a plurality of generally radially diverging spaced apart film supporting ridges projecting above said upper side; said rotor having a peripheral portion; said ridges diverging from said ring shaped surface portion towards said peripheral portion of said rotor; said ridges having inner terminus portions substantially flush with said film holding ring shaped surface portion towards said peripheral portions of said film holding rotor; said ridges being disposed in a generally circular and radiating array around said ring shaped film holding surface portion and said upper film holding surfaces of said radially disposed ridges all declining inwardly towards said ring shaped film holding surface and thus providing a generally dish shaped film holding configuration at the upper side of said film holding rotor; said cover having upper and lower sides, said lower side facing said film holding rotor; said cover having a film guide opening extending therethrough from its lower side to its upper side; said film guide opening disposed generally tangent to said film engaging hub; said film guide opening having an inclined in a direction away from said upper side of said film holding rotor; said cover having a film return opening therein; extending therethrough from its lower side to its upper side; said film guide opening disposed generally tangent to said film engaging hub; said film guide opening having an inclined film edge engaging ramp portion inclined in a direction away from said upper side of said film holding rotor; said cover having a film return opening therein; said cartridge having film guide means adjacent said film return opening and adjacent said peripheral portion of said film holding rotor; said film guide means disposed and adapted to guide film onto said film holding rotor at upper surfaces of said ridges thereon and at a location substantially spaced radially from said ring shaped film supporting surface portion; a spiral roll of film on said rotor; said spiral roll of film comprising spiral convolutions, said spiral roll having a periphery disposed at said location; said spiral roll of film being a continuous and endless loop and comprising a projector related film portion disposed outside said cartridge and between said film guide opening and said film return opening; said film being a thin flat flexible film having opposite edges and opposite sides; said opposite sides being contiguous in said spiral roll on said film holding rotor; the normally lower edges of said convolutions of film engaging said ring shaped surface portion of said rotor and also engaging said inclined surfaces of said radially diverging ridges; whereby rotary winding of said film on said periphery of said spiral roll by rotation of said film holding rotor also causes feeding of film from a delivery area around said hub and through said film guide opening in said cover and whereby the spiral film roll moves on said spaced apart radially diverging ridges and passes from an angular decline to a flat horizontal configuration at the edge of said ring shaped surface all of which tends to hold spiral packing density of the film greater near the periphery of said spiral roll than at said delivery area near said hub and thereby providing relatively loose freedom of said film near said hub enabling it to move out of a spiral packed condition at the said delivery area near said hub and to pass radially through said film guide opening in said cover.

2. The invention as defined in claim 1, wherein a first motor is disposed and adapted for rotatably driving said drive means on said film holding rotor of said cartridge; a projector having a second motor for driving it; said projector having film drive means engagable with said film and adapted for moving said projector related portion of said endless dilm between said film guide opening and said film return opening.

3. The invention as defined in claim 2, wherein a film demand sensing switch is operable in response to displacement of said projector related portion of said film at a location between said film guide opening in said cartridge cover and said film drive means of said projector; said switch in circuit with said first motor for energizing it to rotate said film holding rotor of said cartridge when said projector creates said displacement in said film whereby said cartridge delivers film to said projector on demand of the projector.

4. The invention as defined in claim 3, wherein said film guide means is provided with a spring loaded take up mechanism adapted to prevent slack in said film between said projector and said peripheral portion of said spiral roll of film on said film holding rotor.

5. The invention as defined in claim 4, wherein said film guide means comprises a plurality of idler rollers having peripheral portions over which said film passes; said spring loaded take up mechanism comprises one of said idler rollers having spring means tending to move it laterally relative to its axis of rotation and against said film.

6. The invention as defined in claim 2, wherein said first motor is adapted to drive film of said film holding rotor and a greater linear rate than said second motor causes said projector to drive film there through.

7. The invention as defined in claim 5, wherein said first moter is adapted to drive film on said film holding rotor at a greater linear rate than said second motor causes said projector to drive film there through.

8. The invention as defined in claim 2, wherein a frame is disposed and adapted for holding said cartridge and said projector; said frame adapted to be mounted on a wall structure; said projector having a lens with an axis of projection; said frame having means for rotatably adjusting said projector thereon substantially about asid axis of projection thereof; said frame having means for adjusting said projector about a generally horizontal axis disposed at substantially right angles to said axis of projection; said frame having means for adjusting said projector about a generally vertical axis substantially at right angles to said axis of projection;

9. The invention as defined in claim 8, wherein a wall supports said projector; a floor disposed adjacent said wall; said projector mounted on said wall at an elevation above said floor so as to be within reach of a human operator.

10. The invention as defined in claim 1, wherein said film holding rotor is made of plastic material having a static polarization to prevent static charges from building up on said rotor and said film held thereby to minimize dust collection thereon.

11. The invention as defined in claim 2, wherein said film drive means of said projector comprises a positive film drive mechanism which engages said projector related film portion; said first and second motors being constant speed motors.

12. The invention as defined in claim 11, wherein said first motor is adapted to drive film on said film holding rotor at a greater linear rate than said second rotor causes said projector to drive film there through; a film demand sensing switch operable in response to displacement of said projector related portion of said film at a location between said film guide opening in said cartridge cover and said film drive means of said projector; said switch in circuit with said first motor for intermittently energizing it to rotate said film holding rotor of said cartridge when said projector creates said displacement in said film whereby said cartridge delivers film to said projector on demand of the projector; said film guide means intermittently having spring loaded take up mechanism adapted to prevent slack in said film between said projector and said peripheral portion of said spiral roll of film of said film holding rotor.

13. The invention as defined in claim 3, wherein positive drive means couples said second motor and said film drive means of said projector.

14. The invention as defined in claim 12, wherein positive drive means couples said second motor and said film drive means of said projector.

15. The invention as defined in claim 1, wherein said ridges converge relative to each other in a direction toward said hub and said spiral roll of film, when contracting radially inward, tends frictionally to wedge between said ridges due to relative sag of said film between said ridges.

16. In a continuous play projector and cartridge, the combination of; a base cartridge housing structure; a cover for said base housing structure; a film holding rotor rotatably mounted in close proximity to said base housing and disposed beneath said cover; said film holding rotor being generally circular and rotatable about a substantially vertical axis of rotation; drive means on said rotor adapted for rotatably driving said film holding rotor relative to said base housing structure and said cover; said film holding rotor having an upper side adapted to hold a spiral roll of film thereon; said upper side being generally dish shapped; said cover having a film guide opening extending therethrough; said film guide opening having an inclined film edge engaging ramp portion inclined in a direction away from said film holding rotor; said cover having a film return opening therein; said cartridge having film guide means adjacent said film return opening and adjacent said film holding rotor; said film guide means disposed and adapted to guide film onto said film holding rotor at a location substantially spaced radially from the center thereof; a spiral roll of film on said rotor; said spiral roll of film comprising spiral convolutions, said spiral roll having a periphery disposed at said location; said spiral roll of film being a continuous and endless loop and comprising a projector related film portion disposed outside said cartridge and between said film guide opening and said film return opening; said film being a thin flat flexible film having opposite edges and opposite sides; said opposite sides being contiguous in said spiral roll on said film holding rotor; a first motor is disposed and adapted for rotatably driving said film holding rotor of said cartridge; a projector having a second motor for driving it; said projector having a lens and a light source axially aligned with said lens; said projector having film drive means engagable with said film and adapted for moving said projector related portion of said endless film between said film guide opening and said film return opening and for moving said film directly between said light source and said lens with said opposite sides of said film disposed normal to the axis of said lens.

17. The invention as defined in claim 16, wherein a film tension sensing switch is operable in response to tension of said projector related portion of said film at a location between said film guide opening in said cartridge cover and said film drive means of said projector; said switch in circuit with said first motor for energizing it to rotate said film holding rotor of said cartridge when said projector creates tension in said film whereby said cartridge delivers film through said projector on demand of the projector.

* * * * *